(12) United States Patent
Pickett et al.

(10) Patent No.: US 11,647,691 B2
(45) Date of Patent: May 16, 2023

(54) CLOSE LOOP CONTROL OF AN ILLUMINATION SOURCE BASED ON SAMPLE HEATING

(71) Applicant: Deere & Company, Moline, IL (US)

(72) Inventors: Terence D. Pickett, Waukee, IA (US); Joseph J. Ellerbach, Waukee, IA (US); Michael A. Kool, Urbandale, IA (US)

(73) Assignee: Deere & Company, Moline, IL (US)

( * ) Notice: Subject to any disclaimer, the term of this patent is extended or adjusted under 35 U.S.C. 154(b) by 452 days.

(21) Appl. No.: 16/995,396

(22) Filed: Aug. 17, 2020

(65) Prior Publication Data

US 2022/0046854 A1 Feb. 17, 2022

(51) Int. Cl.
*A01D 41/127* (2006.01)
*H05B 47/105* (2020.01)
(Continued)

(52) U.S. Cl.
CPC .......... *A01D 41/127* (2013.01); *A01B 79/005* (2013.01); *A01D 43/085* (2013.01);
(Continued)

(58) Field of Classification Search
CPC ................ G01N 33/24; G01N 33/246; G01N 2033/245; G01N 19/10; G01N 2223/1013; G01N 23/005; G01N 23/06; G01N 23/203; G01N 27/048; G01N 9/24; G01N 2201/0221; G01N 21/31; G01N 21/255; G01N 21/3554; G01N 21/3563; G01N 23/02; G01N 23/025; G01N 33/42; G01N 21/474; G01N 21/359; G01N 2201/0627; G01N 21/55; G01N 27/223; G01N 2021/4742; G01N 2033/243; G01N 27/043; G01N 21/4738; G01N 2201/0625; G01N 2201/121; G01N 15/1404; G01N 15/1434; G01N 21/65; G01N 2021/0118; G01N 2021/1797; G01N 2021/6417; G01N 21/33; G01N 21/35; G01N 21/645; G01N 2201/0634; G01N 2201/0691; G01N 1/30; G01N 1/38; G01N 2021/4769; G01N 21/01; G01N 21/51; G01N 25/4866; G01N 30/00; G01N 30/02; G01N 33/362; G01N 2021/1738; G01N 2021/3595; G01N 21/27; G01N 2201/021; G01N 2201/0636;
(Continued)

(56) References Cited

U.S. PATENT DOCUMENTS 5,870,689 A 2/1999 Hale et al.
2008/0137087 A1 6/2008 Greten et al.
(Continued)

OTHER PUBLICATIONS

Extended European Search Report and Written Opinion issued in European Patent Application No. 21187032.4, dated Jan. 21, 2022, in 07 pages.

*Primary Examiner* — Michael P Stafira
(74) *Attorney, Agent, or Firm* — Joseph R. Kelly; Kelly, Holt & Christenson PLLC

(57) ABSTRACT

Crop is routed past a sample window on an agricultural combine harvester. Light it is impinged on the crop from an illumination source and reflected radiation is directed to a sensor. The output of the sensor is indicative of various constituents in the harvested crop. The illumination source is controlled based on the temperature proximate the crop sample.

20 Claims, 7 Drawing Sheets

(51) Int. Cl.
*A01B 79/00* (2006.01)
*A01D 43/08* (2006.01)
*G01N 21/25* (2006.01)
*G01N 21/17* (2006.01)

(52) U.S. Cl.
CPC ......... *G01N 21/255* (2013.01); *H05B 47/105* (2020.01); *G01N 2021/1797* (2013.01)

(58) Field of Classification Search
CPC ............. G01N 33/0098; G01N 33/025; G01N 33/493; G01N 1/28; G01N 15/0826; G01N 2021/8466; G01N 21/17; G01N 21/25; G01N 21/3151; G01N 21/3504; G01N 21/39; G01N 21/6486; G01N 21/83; G01N 2800/085; G01N 33/02; G01N 33/60; G01N 5/045; A01B 79/005; A01B 49/06; A01B 79/02; A01B 61/00; A01B 61/04; A01B 63/111; A01B 63/16; A01B 63/008; A01B 27/005; A01B 69/001; A01B 47/00; A01B 49/04; A01D 41/127; A01D 61/00; A01D 43/085; A01D 41/06; A01D 41/1277; H05B 47/105; H05B 6/707; H05B 2206/046; H05B 6/763; H05B 6/80
See application file for complete search history.

(56) References Cited

U.S. PATENT DOCUMENTS

| | | |
|---|---|---|
| 2017/0112057 A1 | 4/2017 | Loukili et al. |
| 2019/0369243 A1 | 12/2019 | Ghiraldi et al. |
| 2020/0337232 A1* | 10/2020 | Blank ................. A01M 7/0089 |

* cited by examiner

CLOSE LOOP CONTROL OF AN ILLUMINATION SOURCE BASED ON SAMPLE HEATING

FIELD OF THE DESCRIPTION

The present description relates to agricultural sensors. More specifically, the present description relates to controlling an agricultural sensor on an agricultural mobile machine.

BACKGROUND

There are many different types of agricultural machines, including agricultural harvesters. There are also many different types of agricultural harvesters. Some such harvesters include combine harvesters, self-propelled forage harvesters, sugarcane harvesters, cotton harvesters, among others.

Harvested, crops are sometimes sampled to determine whether they have various different characteristics. For instance, in one example, a crop sample is illuminated and is analyzed for constituents with a spectrometer or other light sampling device.

Different proteins, oils, and other substances absorb certain light spectra. Therefore, by performing spectral analysis based on notches in the reflected radiation, the system can identify the levels of those constituent elements. High starch corn, for instance, may be more valuable for ethanol production than lower starch corn. High protein wheat may be more valuable for certain things than lower protein wheat, etc.

The discussion above is merely provided for general background information and is not intended to be used as an aid in determining the scope of the claimed subject matter.

SUMMARY

Crop is routed past a sample window on an agricultural harvester. Light is impinged on the crop from an illumination source and reflected radiation is directed to a spectrometer. The output of the spectrometer is indicative of various constituents in the harvested crop. The illumination source is controlled based on the temperature proximate the crop sample.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
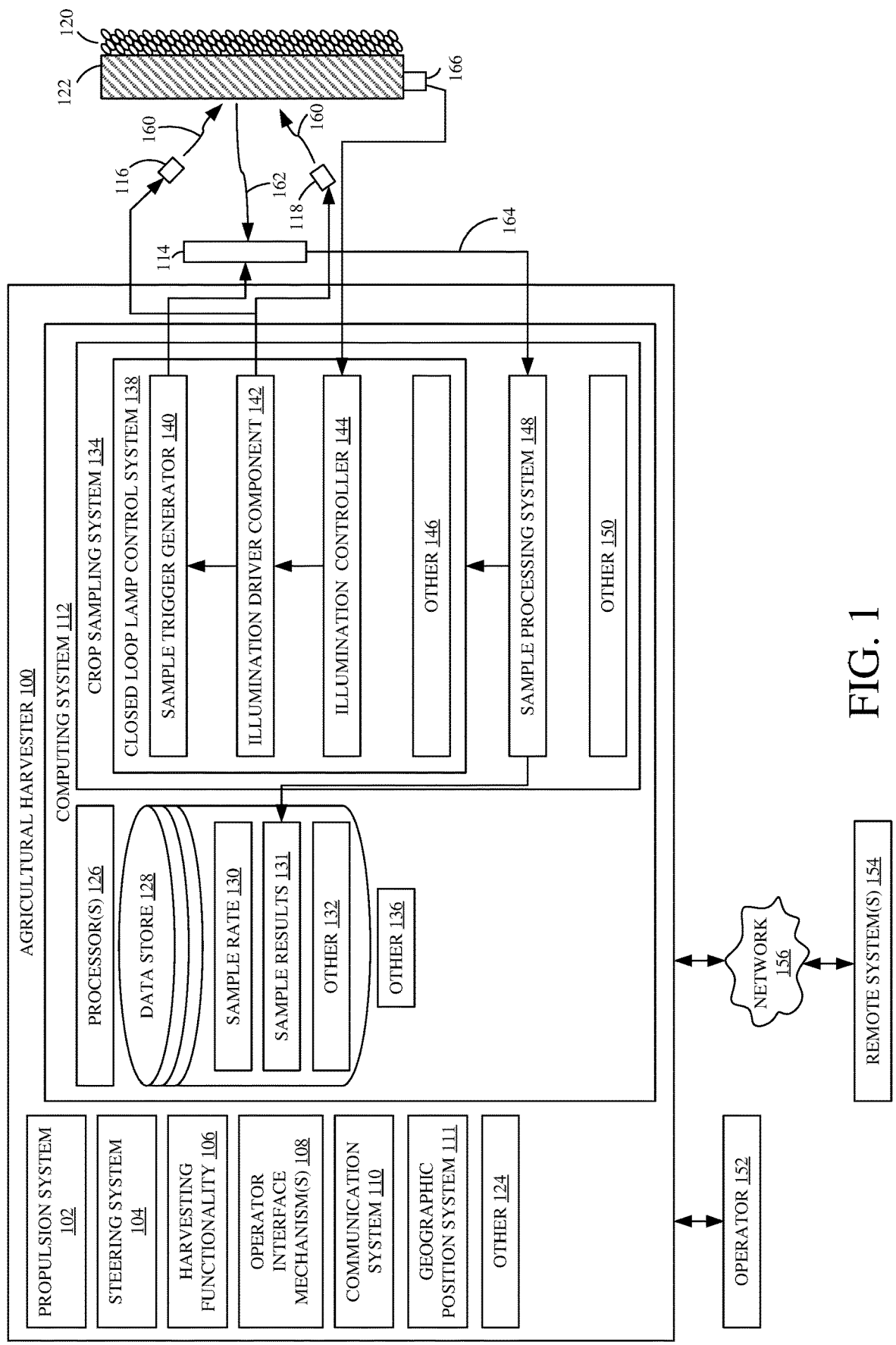
FIG. 1 is a block diagram of one example of a portion of an agricultural harvester with a crop sampling system.

As discussed above, some harvested crop is sampled for constituent elements. Some sampling systems are deployed on agricultural harvesters so the crop is sampled during the harvesting operation. For instance, some agricultural harvesters sample crop for various constituents using a spectrometer or other light sampling device. In such machines, an illumination source emits light onto the crop sample through a lens or sampling window. Radiation is reflected off of the crop sample onto a spectroscopy chip, a MEMS interferometer or other spectral analysis sensor. In order to obtain consistent constituent measurements, the intensity of the radiation emitted by the illumination source is held relatively constant during sampling. However, when the ambient temperature in the area of the sample analysis operation varies over a relatively wide range, then the temperature increase caused by the intensity of the radiation emitted by the illumination source can also vary. This can compromise the overall success in making consistent constituent measurements.

In addition, if the illumination source is activated, at full power, the crop sample proximate the sample window can get hot, especially if the crop sample is captured and held in place for a significant duration, in order to take the measurement. This problem can be exacerbated when the ambient temperature increases.

This problem could be addressed by periodically switching off the illumination source to ensure that the crop sample cools down sufficiently. However, this increases the sample time because, in order for there to be consistent sampling measurements, the intensity of the illumination source must be relatively consistent. If it is turned off and allowed to cool down too far, this increases the time needed for the illumination source to power back up to the desired intensity. Thus, simply turning off the illumination source periodically (with an off period sufficient to guarantee that the sample temperature will cool down enough in all weather) reduces the efficiency of the overall sampling process. For instance, when the ambient temperature is relatively cool, it may be that the illumination source needs to only be turned off a very short time, whereas when the ambient temperature is relatively hot, this may mean that the illumination source should be turned off for a longer period of time. Therefore, if a uniform or periodic cycling of the illumination source is used, then the system is not optimized for ambient temperature. Sub-optimization of the sampling system can lead to less granular (and thus less precise) sample results.

By sampling at the highest rate possible, the samples are attributed to a smaller area of the field. This means that the crop from the field is sampled with higher frequency, and the samples are thus more precise in reflecting the characteristics of the crop, itself, than if the samples are taken less frequently.

The present description thus proceeds with respect to a system that uses a temperature sensor on the sampling window, past which the crop sample travels. The temperature sensor provides a temperature signal, indicative of the temperature of the crop sampling window (or another area proximate the crop sample), to an illumination controller that controls the illumination source so that it is on (or active) until the temperature of the sampling window reaches a threshold temperature value. The illumination controller then turns off the illumination source until the temperature of the sampling window reaches a second threshold temperature, which is lower than the first threshold temperature. It then turns the illumination source back on so that additional samples can be taken. In this way, the illumination source is controlled based on a desired sample rate and based on the temperature of the sampling window so that samples can be taken at a high frequency, regardless of the ambient temperature, while still inhibiting crop overheating.

FIG. 1 shows one example of an agricultural harvester 100. Harvester 100 illustratively includes propulsion system 102, steering system 104, a variety of different harvesting functionality 106 (which will vary based on the type of harvester), operator interface mechanisms 108, communication system 110, geographic position system 111, computing system 112, and a spectrometer device or spectroscopy device, or interferometer (or other spectral analysis sensor) 114, sources of illumination 116 and 118, a crop sample 120 that travels past a sample window element 122 that defines a sample window, and it can include a wide variety of other items 124. Computing system 112, itself, can include one or more processors 126, data store 128 (which can include a sample rate 130 sample results 131 and other items 132), crop sampling system 134, and other items 136. Crop sampling system 134 can include closed loop lamp control system 138 (which can itself include sample trigger generator 140, illumination driver component 142, illumination controller 144 and other items 146), sample processing system 148 and other items 150. FIG. 1 also shows that agricultural harvester 100 can be operated by an operator 152 and can be connected one or more remote systems 154 over a network 156. Network 156 can thus be a wide area network, a local area network, a near field communication network, a cellular communication network, or any of a wide variety of other networks or combinations of networks. Remote systems 154 can be systems in remote server environments, (e.g., cloud-based systems), farm manager systems, vendor systems, or other remote systems. Before describing the overall operation of agricultural harvester 100 in controlling illumination sources 116 and 118, a brief description of some of the items in harvester 100, and their operation, will first be provided.

Propulsion system 102 propels a set of ground-engaging elements (such as wheels or tracks) on agricultural harvester 100 to move it. Steering system 104 can be controlled by operator 152, or automatically, to steer agricultural harvester 100. Other harvesting functionality can be any of a wide variety of different types of functionality, such as header functionality, crop accelerator, separator, and cleaning mechanisms, when the harvester is a combine harvester. It can include silage generation functionality where the harvester is a forage harvester. It can include billet generation functionality when the harvester is a sugarcane harvester and bale generation functionality when the harvester is a cotton harvester. These are examples only and other harvesting functionality can be used based upon the type of harvester.

Operator interface mechanisms 108 can include a wide variety of different mechanisms that operator 152 can interact with in order to control agricultural harvester 100. Therefore, they can include steering wheels, pedals, levers, linkages, joysticks, buttons, a microphone and speaker (where speech recognition and synthesis are provided), a user actuatable display which can be actuated using a point and click device, using touch gestures, or otherwise, or a wide variety of other user interface mechanisms.

Communication system 110 can be used to enable communication among the various items of agricultural harvester 100 and also communication between harvester 100 and remote systems 104. Therefore, communication system 110 can include a controller area network (CAN) communication system, a cellular communication system, a wide area network communication system, a local area network communication system, or any of a wide variety of other systems or combination of systems. Geographic position system 111 can include a global navigation receiver for receiving GNSS signals, a dead reckoning system, or any of a wide variety of other positioning systems that generate a position signal indicative of a geographic position or location of agricultural harvester 100.

Crop sampling system 134 illustratively handles crop sampling so that as a crop sample 120 moves adjacent sampling window element 122, illumination sources 116 and 118 can be activated, or turned on, to illuminate crop sample 120 through window element 122. Element 122 can be glass, polymer, or other material that allows the radiation to pass through. Radiation 160 thus impinges on the crop sample 120 through window element 122. Radiation 162 is reflected off of the crop sample 120, and travels through window element 122 and impinges on sensor 114. Sensor 114 generates an output 164, which is provided to sample processing system 148. Sample processing system 148 identifies constituent elements in the crop sample 120, based upon a spectral analysis of the reflected radiation 162. Sample processing system 148 can also provide an output to closed loop lamp control system 138 which controls the illumination sources 116 and 118.

Window element 122 illustratively has a temperature sensor 166 disposed thereon. Temperature sensor 166 can be any of a wide variety of different temperature sensors that senses the temperature of sample window element 122 and provides an output signal, indicative of that temperature, to illumination controller 144. Illumination controller 144 thus generates a signal to illumination driver component 142 indicating whether the illumination sources 116 and 118 should be turned on or off based upon the temperature generated by temperature sensor 166. Illumination driver component 142 can then provide an output signal to drive illumination sources 116 and 118 to turn them on and off based upon the output from illumination controller 144. Illumination controller 144 may also detect a desired sample rate 130 (which can be stored in data store 128 or elsewhere) to determine how often to sample the grain as it passes window element 122. The sample rate 130 may indicate that the grain is to be sampled once per second, once every three seconds, as often as possible, etc. Thus, based upon the temperature of the sample window element 122 and the desired sample rate 130, illumination controller 144 generates an output to illumination driver component 142 indicating that illumination driver component 142 should turn on or off the illumination sources 116 and 118.

Under certain circumstances, especially when the harvesting operation is beginning, it may take a threshold amount of time for illumination sources 116 and 118 to reach a sufficient power output that the samples taken will be consistent. Therefore, illumination driver component 142 can provide an output to sample trigger generator 140 to indicate that the illumination sources 116 and 118 have been on long enough to reach a sufficient power to provide consistent sampling results. At that point, sample trigger generator 140 can generate an output to sensor 114 indicating that a sample should be taken, based upon the radiation 162 impinging thereon, and an output 164 can be provided from spectrometer chip 114 to sample processing system 148 for analysis.

Sample processing system 148 can generate an output to store the sample results 131 in data store 128 so they can be displayed to operator 152 over an operator interface mechanism 108. The sample results 131 can also be sent to remote systems 154, or elsewhere, using communication system 110.

Figure 2:
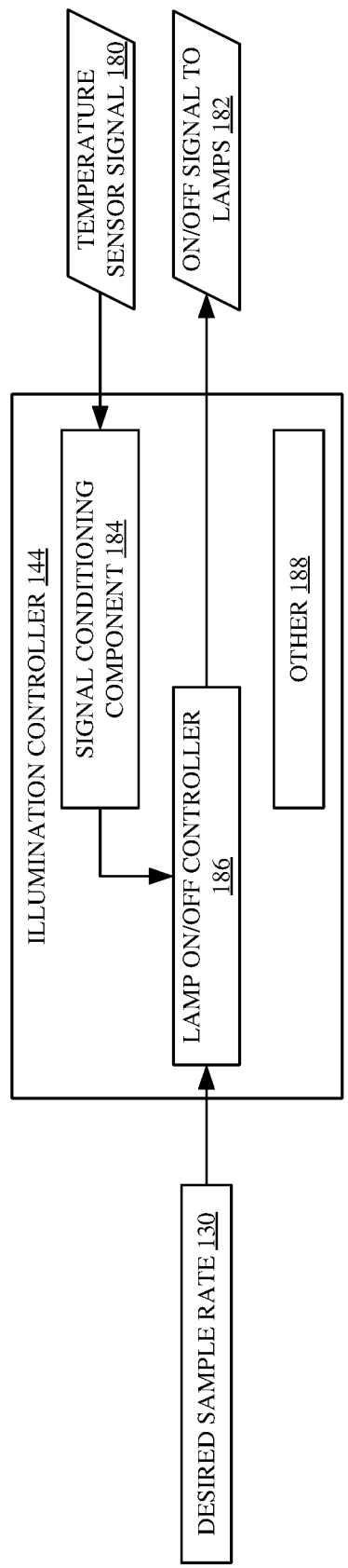
FIG. 2 is a block diagram showing one example of an illumination controller, in more detail.

FIG. 2 is a block diagram showing one example of illumination controller 144, in more detail. FIG. 2 shows that illumination controller 144 receives a desired sample rate 130. It also receives the temperature sensor signal 180 from temperature sensor 166. It generates an output signal 182 to turn on and off illumination sources 116 and 118, based upon the desired sample rate 130 and the temperature of sample window 122, reflected by temperature sensor signal 180.

In the example shown in FIG. 2, illumination controller 144, itself, illustratively includes signal conditioning component 184, lamp on/off controller 186, and it can include other items 188. Signal conditioning component 184 can include functionality such as filtering functionality which smooths the temperature sensor signal 180. It can also include amplification functionality, normalization or linearization functionality, among other signal conditioning functionality. Lamp on/off controller 186 generates on/off signals 182 (which are provided to illumination driver component 184 for generating the actual illumination drive signals) based upon the desired sample rate 130. In doing so, controller 186 ensures that the temperature of the sample window element 122, sensed by temperature sensor 166, does not exceed a threshold temperature value but also ensures that the illumination sources 116 and 118 do not cool down too much so as to undesirably slow down the sample rate. Thus, controller 186 attempts to control illumination sources 116 and 118 so that the desired sample rate 130 can be achieved, while still not overheating the crop sample 120 (by overheating the sample window element 122).

Figure 3:
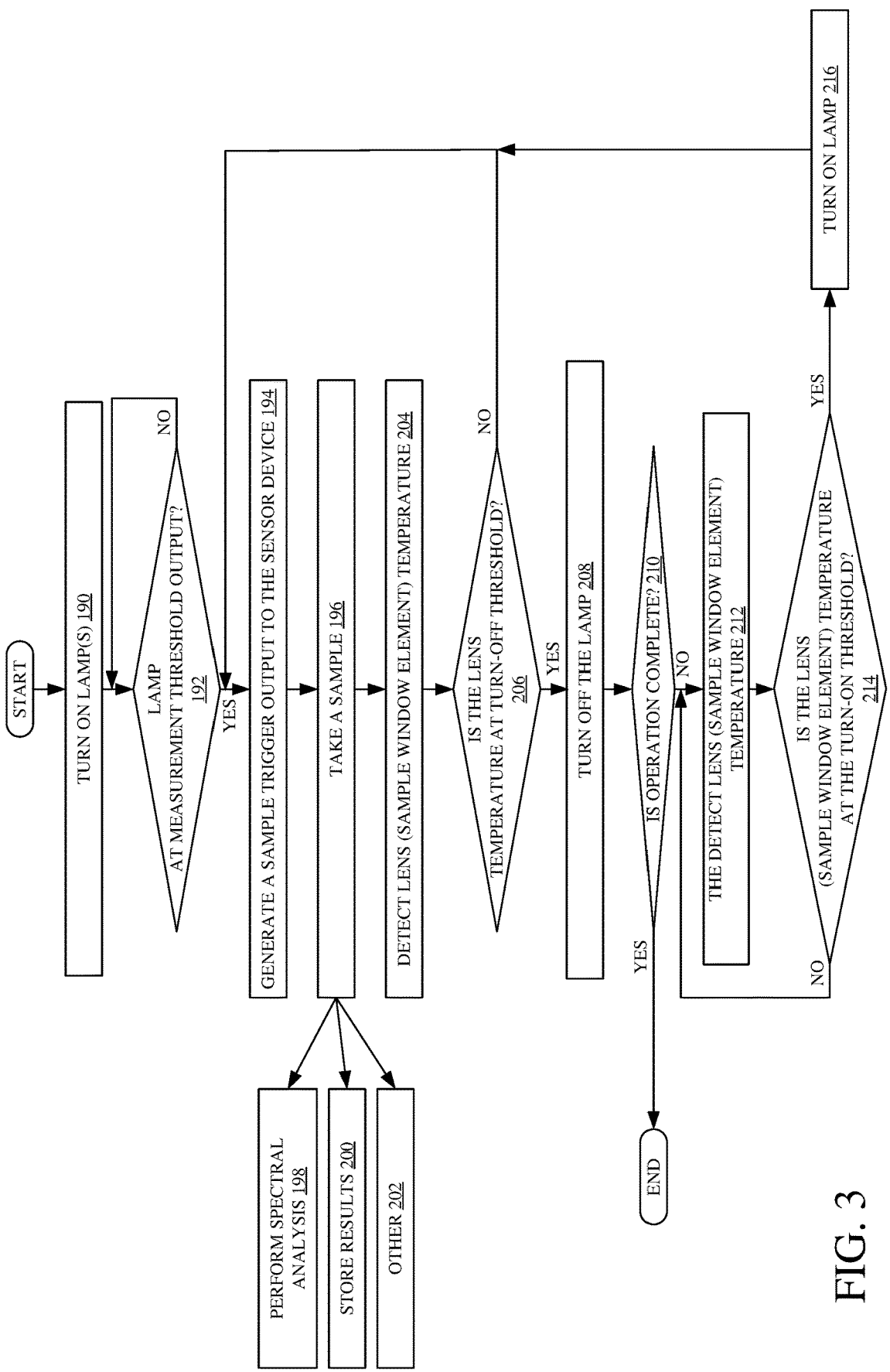
FIG. 3 is a flow diagram illustrating one example of the operation of the illumination controller.

FIG. 3 is a flow diagram illustrating one example of the operation of illumination controller 144, in more detail. It is assumed that, at some point, agricultural harvester 100 will begin operating so that samples are to be taken by crop sampling system 134. Thus, at some point, lamp on/off controller 186 generates a lamp on signal 182 and provides it to illumination driver component 142, which generates an output signal to turn on the lamps. This is indicated by block 190 in the flow diagram of FIG. 3. It is also assumed that illumination sources 116 and 118 (the lamps) are to be turned on for some period during which the output illumination level ramps up to full power, or to a threshold power that is sufficient to take an accurate spectral sample. Sample trigger generator 140 (based on an output from driver component 142 or controller 144 indicating that the lamps have been turned on) determines whether the lamp output is at the measurement threshold level so that an accurate measurement can be taken. This is indicated by block 192 in the flow diagram of FIG. 3.

Once the lamps 116-118 are at the measurement threshold output level, then sample trigger generator 140 generates a sample trigger and provides it to sensor 114. This triggers sensor 114 to take a measurement or sample based upon the reflected radiation 162, corresponding to the crop sample 120. Generating a sample trigger output to sensor device 114 is indicated by block 194 in the flow diagram of FIG. 3, and taking a sample using sensor 114 is indicated by block 196.

The sample from sensor 114 is provided to sample processing system 148 which performs a spectral analysis on the output to identify various constituent elements in crop sample 120. The results can be provided from system 148 to data store 128 as sample results 131. Performing spectral analysis is indicated by block 198 in the flow diagram of FIG. 3. Storing the sample results is indicated by block 200. The sample can be taken and processed in other ways as well, and this is indicated by block 202.

During the sampling, temperature sensor 166 senses the temperature of sample window element (or lens) 122 and provides the temperature sensor signal 180 back to signal conditioning component 184 in illumination controller 144. Detecting the lens (or sample window element) temperature is indicated by block 204 in the flow diagram of FIG. 3. Lamp on/off controller 186 compares the temperature of element 122 to a threshold temperature to determine whether lamp on/off controller 186 should turn off lamps 116 and 118 so that element 122 can cool down. This is indicated by block 206. If, at block 206, it is determined that the temperature of sample window element 122 has not yet reached the turn off threshold, then processing reverts to block 194 where sample trigger generator 140 can generate a trigger signal and provide it to sensor 114 to continue to take samples, at the desired sample rate.

However, if at block 206 lamp on/off controller 186 determines that the sample window element 122 has reached the turn off temperature threshold, then lamp on/off controller 186 generates an output signal so that illumination driver component 142 turns off lamps 116 and 118. Turning off the lamps is indicated by block 208 in the flow diagram of FIG. 3.

Unless the harvesting operation is complete, as indicated by block 210 in the flow diagram of FIG. 3, lamp on/off controller 186 continues to detect the sample window element temperature to determine whether it has dropped sufficiently so that the lamps can be turned back on and so that sample trigger generator 140 can trigger more samples to be taken by sensor 114. Detecting the sample window temperature is indicated by block 212 and determining whether it has dropped sufficiently to reach a turn-on threshold temperature is indicated by block 214. If not, lamp on/off controller 186 simply waits for the temperature to drop further, and processing reverts to block 212.

However, once the temperature of sample window element 122 has dropped to the turn on threshold temperature, then lamp on/off controller 186 again generates an output signal 182 to illumination driver component 184 to turn the lamps back on. This is indicated by block 216. With the lamps back on, processing reverts to block 194 where sample trigger generator 140 can again continue to generate sample triggers so that sensor 114 can take more samples.

Figure 4:
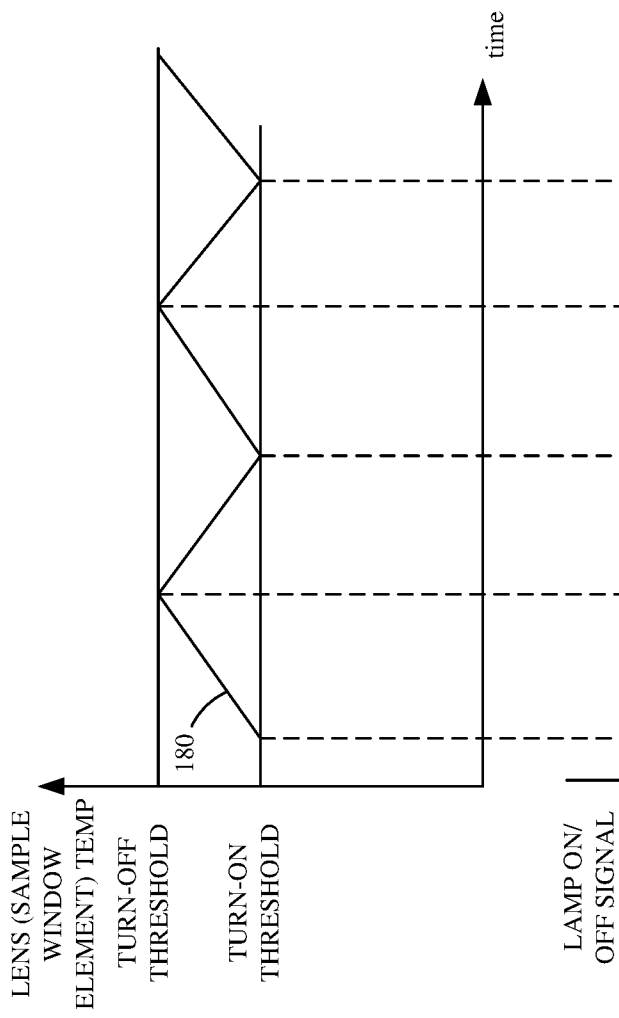
FIG. 4 is a graph showing temperature vs. time.
Figure 5:
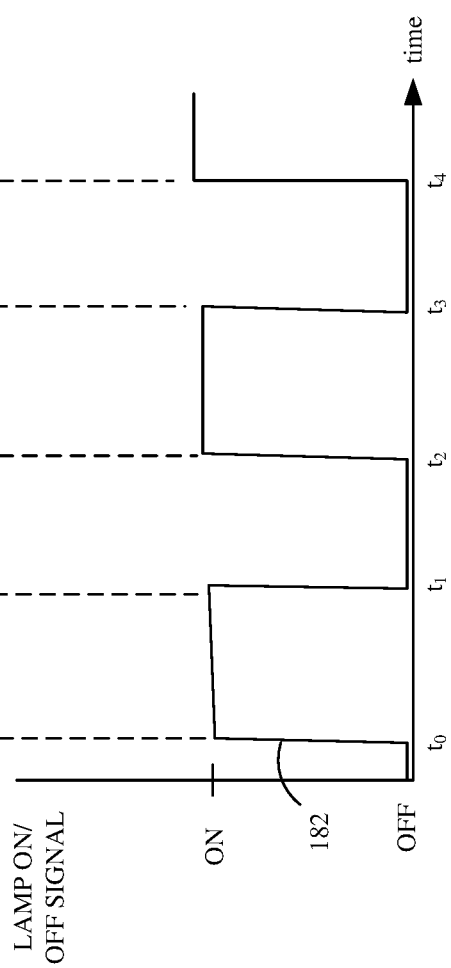
FIG. 5 is a graph showing the illumination source control signal vs. time.

FIGS. 4 and 5 are graphs illustrating how the temperature sensor signal 180 varies relative to the lamp on/off signal 182. FIG. 4 graphs the temperature indicated by the temperature sensor signal 180 versus time. FIG. 4 shows that the temperature sensor signal can be compared against a turn on threshold and a turn off threshold. The turn off threshold is a temperature at which sample window element 122 is becoming too hot so the lamps 116 and 118 should be turned off, allowing element 122 to cool down. The turn on threshold is a temperature at which sample window element 122 is sufficiently cool so that the lamps 116 and 118 can be turned back on. It will be noted that, in one example, the turn on threshold is still high enough so that once lamps 116 and 118 are turned on, they are at a sufficient power level so that sensor 114 can take consistent samples. More specifically, when the lamps 116 and 118 are cold (e.g., near ambient temperature) it may take some time for them to heat up sufficiently (once they are turned on) so that the spectral results will be consistent. In one example, the turn on threshold is set high enough so that once the lamps are turned on (after they have cooled down from the turn off threshold) the amount of time needed to take consistent spectral results is a very short time, or is zero. Thus, the sampling rate will not suffer simply because the lamps 116 and 118 are intermittently turned off to allow the sample window element temperature to cool down.

FIG. 5 shows that at time t0, the lamps 116 and 118 are turned on, as indicated by the on/off signal 182. When this happens, the temperature of sample window element 122 will eventually reach the turn on threshold and continue to ramp upwardly. Once the temperature of sample window element 122 reaches the turn off threshold, at time t1, then lamp on/off controller 186 generates the on/off signal 182 to turn off the lamps 116 and 118. During the time from t0 to t1, sample trigger generator 140 can trigger sensor 114 to take samples based on the desired sample rate 130. Once the lamps 116 and 118 are turned off, this causes the temperature signal 180 of the sample window 122 to begin to fall until it again reaches the turn on threshold at time t2. At that point, lamp on/off controller 186 then turns the lamps on again and the temperature signal 180 begins to rise until it reaches the turn off threshold at time t3 when the lamps are turned off and the temperature again begins to fall until it reaches the turn on threshold at time t4. This type of operation illustratively continues, with samples enabled when lamps 116 and 118 are on, until the harvesting operation is complete.

It can thus be seen that the present description describes a system which controls the illumination sources 116 and 118 based on the temperature of the sampling window element 122, instead of simply periodically. This ensures that the sample rate can be as high as possible, while still not overheating the crop samples.

A number of more specific examples of agricultural harvester 100 will now be provided. These are examples only.

Figure 6:
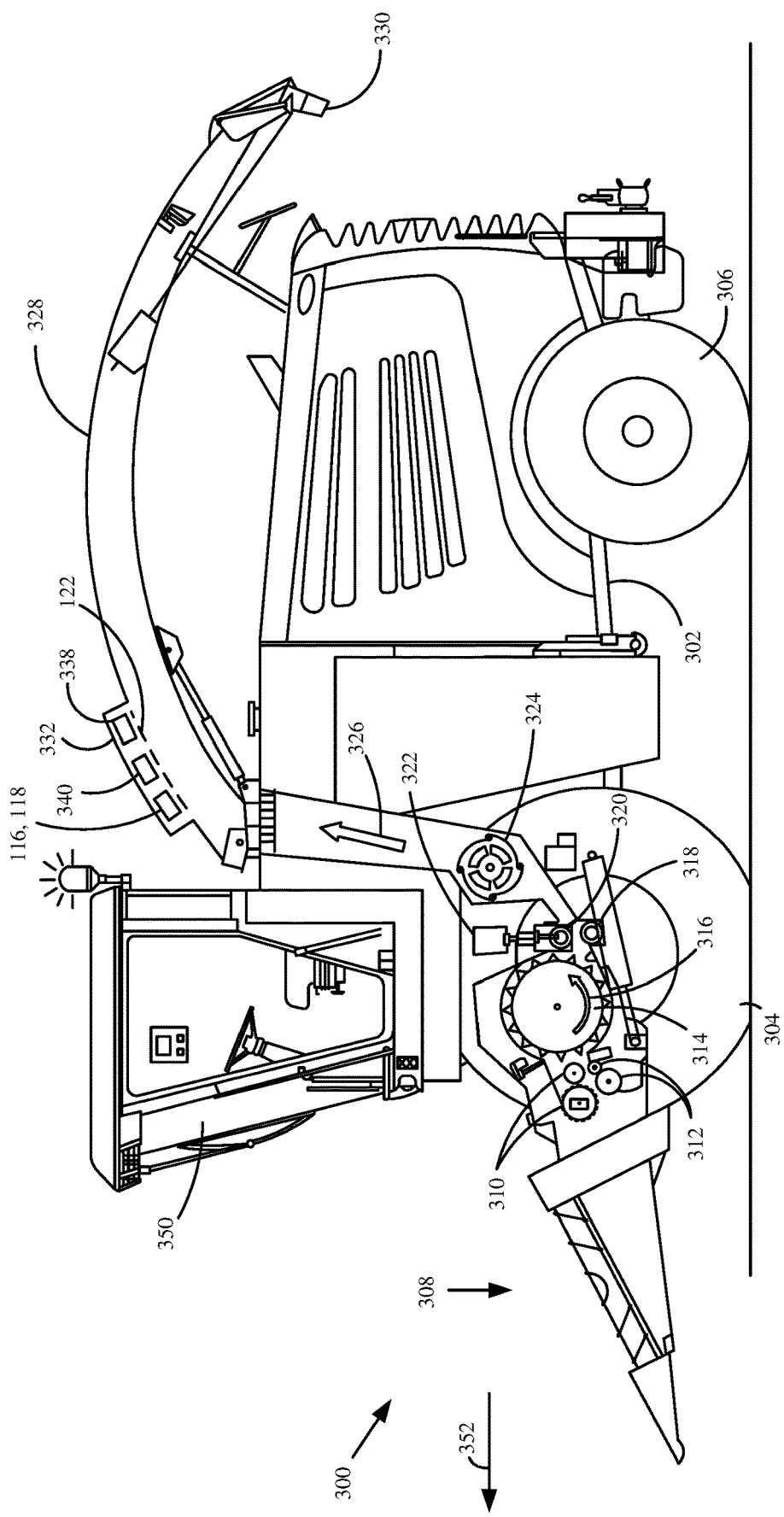
FIG. 6 is a partial pictorial, partial schematic illustration of a self propelled forage harvester.

FIG. 6 is a partial pictorial, partial sectional view an example in which agricultural harvester 100 is a forage harvester 300. Forage harvester 300 illustratively includes a mainframe 302 that is supported by ground engaging elements, such as front wheels 304 and rear wheels 306. The wheels 304, 306 can be driven by an engine (or other power source) through a transmission. They can be driven by individual motors (such as individual hydraulic motors) or in other ways.

FIG. 6 shows that, in the example illustrated, forage harvester 300 includes operator compartment 350. Operator compartment 350 has a plurality of different operator interface mechanisms 108 that can include such things as pedals, a steering wheel, user interface display devices, touch sensitive display screens, a microphone and speech recognition components, speech synthesis components, joysticks, levers, buttons, as well as a wide variety of other mechanical, optical, haptic or audio interface mechanisms. During operation, the machine moves in the direction generally indicated by arrow 352.

A header 308 is mounted on the forward part of forage harvester 300 and includes a cutter that cuts or severs the crop being harvested, as it is engaged by header 308. The crop is passed to upper and lower feed rolls 310 and 312, respectively, which move the harvested material to chopper 314. In the example shown in FIG. 6, chopper 314 is a rotatable drum with a set of knives mounted on its periphery, which rotates generally in the direction indicated by arrow 316. Chopper 314 chops the harvested material received through rollers 310-312, into pieces, and feeds it to a kernel processing unit which includes kernel processing rollers 318 and 320. The kernel processing rollers 318 and 320 are separated by a gap and are driven by one or more different motors which can drive the rollers at different rotational speeds. Therefore, as the chopped, harvested material is fed between rollers 318 and 320, the rollers crush and grind the material (including the kernels) into fragments.

In one example, at least one of the rollers 318 and 320 is mounted for movement under control of actuator 322. Actuator 322 can be an electric motor, a hydraulic actuator, or any other actuator which drives movement of at least one of the rollers relative to the other, to change the size of the gap between rollers 318 and 320 (the kernel processing gap). When the gap size is reduced, this can cause the kernels to be broken into smaller fragments. When the gap size is increased, this can cause the kernels to be broken into larger fragments, or (if the gap is large enough) even to remain unbroken. The kernel processing rollers 318 and 320 can have surfaces that are relatively cylindrical, or the surfaces of each roller can have fingers or knives which protrude therefrom, and which cooperate with fingers or knives of the opposite kernel processing roller, in an interdigitated fashion, as the rollers turn. These and other arrangements or configurations are contemplated herein.

The processed crop is then transferred by rollers 318-320 to conveyor 324. Conveyor 324 can be a fan, or auger, or other conveyor that conveys the harvested and processed material upwardly generally in the direction indicated by arrow 326 through chute 328. The crop exits chute 328 through spout 330.

In the example shown in FIG. 6, chute 328 includes an image capture housing 332 disposed on the side thereof. If can be separated from the interior of chute 328 by an optically permeable barrier (or sample window element) 122. Barrier 122 can be, for instance glass, plastic, or another barrier that permits the passage of at least certain wavelengths of light therethrough. Housing 332 illustratively includes a radiation source 116, 118, a spectral analysis sensor 114, and can also include an image capture device 340. Radiation source 116, 118 illustratively illuminates the crop passing through chute 328 with radiation. Sensor 114 detects radiation that is fluoresced or otherwise transmitted from the crop, and image capture device 340 can capture an optical image of the crop. Sensor 114 can sense radiation spectra reflected by the crop and sample processing system 148 can identify constituent elements of the sampled crop. Also, based on the image and the sensed radiation, a size distribution indicative of the distribution of the size of the kernels or kernel fragments in the harvested crop passing through chute 328 can be identified. It can be passed to a control system which controls the speed differential of rollers 118 and 120, and/or the size of the gap between rollers 318 and 320 based upon the size distribution of kernels and kernel fragments.

It will also be noted that, in another example, instead of having the sensors in housing 332 sense characteristics of the crop passing through chute 328, a sample of the crop can be diverted into a separate chamber, where its motion is momentarily stopped so the image can be taken and the characteristics can be sensed. The crop can then be passed back into the chute 328 where it continues to travel toward spout 330. These and other arrangements and configurations are contemplated herein.

Figure 7:
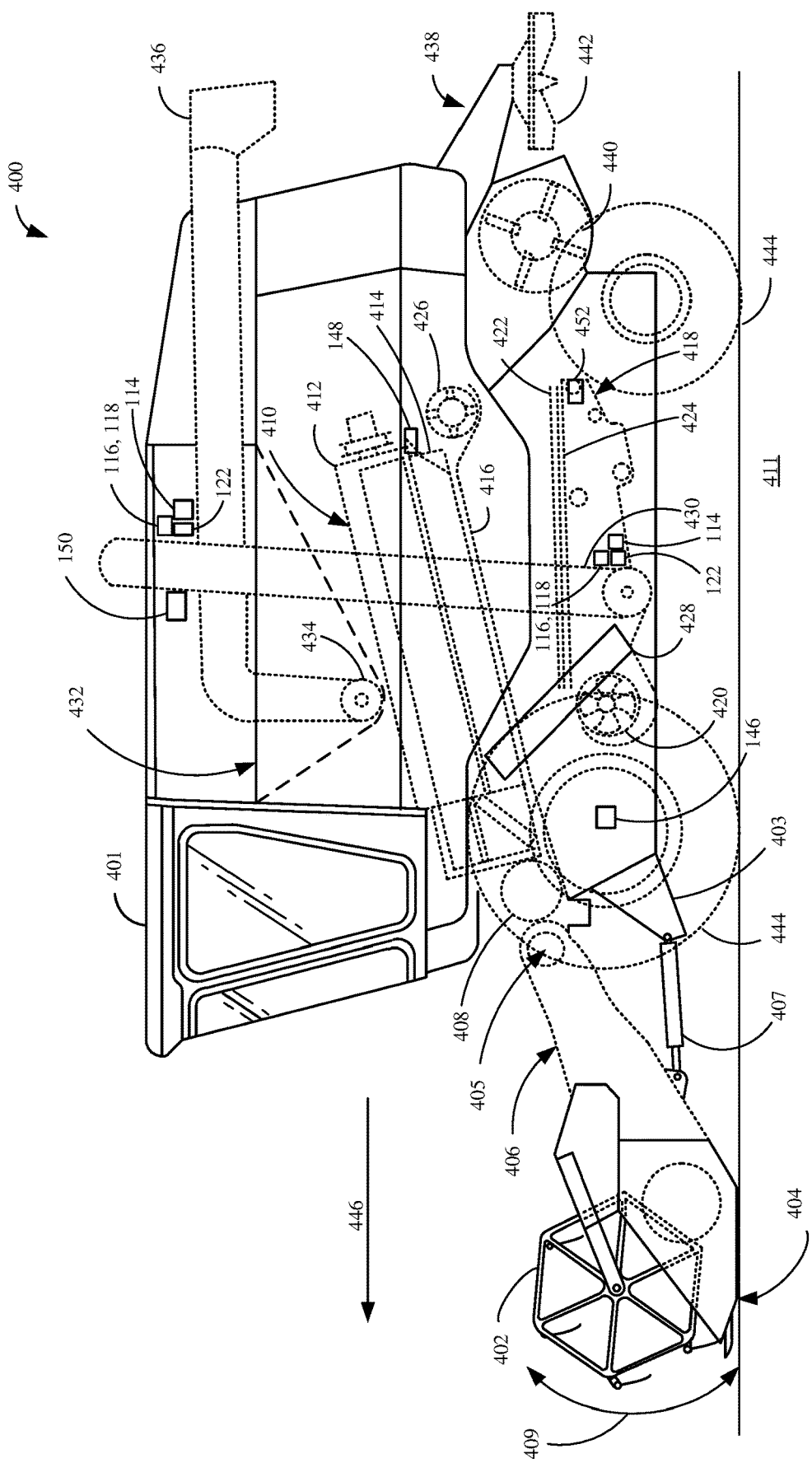
FIG. 7 is a partial pictorial, partial schematic illustration of a combine harvester.

FIG. 7 is a partial pictorial, partial schematic, illustration of a self-propelled agricultural harvester 100, in an example where harvester 100 is a combine harvester (or combine) 400. It will be appreciated that the present description can just as easily be applied to a cotton harvester, a sugarcane harvester, a windrower or other agricultural harvesters. It proceeds now with respect to a combine harvester by way of example only.

It can be seen in FIG. 7 that combine 400 illustratively includes an operator compartment 401, which can have a variety of different operator interface mechanisms 108, for controlling combine 400. Combine 400 can include a set of front end equipment that can include header 402, and a cutter generally indicated at 404. It can also include a feeder house 406, a feed accelerator 408, and a thresher generally indicated at 410. Header 402 is pivotally coupled to a frame 403 of combine 400 along pivot axis 405. One or more actuators 407 drive movement of header 402 about axis 405 in the direction generally indicated by arrow 409. Thus, the vertical position of header 402 (the header height) above ground 411 over which it is traveling can be controlled by actuating actuator 407. While not shown in FIG. 7, it may be that the tilt and/or roll angle of header 402 or portions of header 402 can be controlled by separate actuators. Tilt, refers to the angle at which the cutter engages the crop, the angle being defined about an axis that is traverse (e.g., orthogonal) to the direction of movement of the harvester 400. The roll refers to the orientation of header 402 about the front-to-back longitudinal axis of combine 400.

Thresher 410 illustratively includes a threshing rotor 412 and a set of concaves 414. Further, combine 400 can include a separator 416 that includes a separator rotor. Combine 400 can include a cleaning subsystem (or cleaning shoe) 418 that, itself, can include a cleaning fan 420, chaffer 422 and sieve 424. The material handling subsystem in combine 400 can include (in addition to a feeder house 406 and feed accelerator 408) discharge beater 426, tailings elevator 428, clean grain elevator 430 (that moves clean grain into clean grain tank 432) as well as unloading auger 434 and spout 436. Combine 400 can further include a residue subsystem 438 that can include chopper 440 and spreader 442. Combine 400 can also have a propulsion subsystem that includes an engine that drives ground engaging wheels 444 or tracks, etc. It will be noted that combine 400 may also have more than one of any of the subsystems mentioned above (such as left and right cleaning shoes, separators, etc.).

In operation, and by way of overview, combine 400 illustratively moves through a field in the direction indicated by arrow 447. As it moves, header 402 (and the associated reel) engages the crop to be harvested and gathers it toward cutter 404. The operator illustratively sets a height setting for header 402 (and possibly a tilt and/or roll angle setting) and a control system controls actuator 407 (and possibly a tilt and/or roll actuators—not shown) to maintain header 402 at the set height above ground 411 (and at the desired tilt and/or roll angles). The control system responds to header error (e.g., the difference between the set height and measured height of header 404 above ground 411 and possibly tilt and/or roll angle error) with a responsiveness that is determined based on a set sensitivity level. If the sensitivity level is set high, the control system responds to, smaller header position errors, and attempts to reduce them more quickly than if the sensitivity is set lower.

Returning to the description of the operation of combine 400, after the crop is cut by cutter 404, it is moved through a conveyor in feeder house 406 toward feed accelerator 408, which accelerates the crop into thresher 410. The crop is threshed by rotor 412 rotating the crop against concaves 414. The threshed crop is moved by a separator rotor in separator 416 where some of the residue is moved by discharge beater 426 toward the residue subsystem 438. It can be chopped by residue chopper 440 and spread on the field by spreader 442. In other configurations, the residue is simply chopped and dropped in a windrow, instead of being chopped and spread.

Grain falls to cleaning shoe (or cleaning subsystem) 418. Chaffer 422 separates some of the larger material from the grain, and sieve 424 separates some of the finer material from the clean grain. Clean grain falls to an auger which moves the grain to an inlet end of clean grain elevator 430, which moves the clean grain upward and deposits it in clean grain tank 432. Residue can be removed from the cleaning shoe 418 by airflow generated by cleaning fan 420. Cleaning fan 420 directs air along an airflow path upwardly through the sieves and chaffers and the airflow carries residue rearwardly in combine 400 toward the residue handling subsystem 438.

Tailings can be moved by tailings elevator 428 back to thresher 410 where they can be re-threshed. Alternatively, the tailings can also be passed to a separate re-threshing mechanism (also using a tailings elevator or another transport mechanism) where they can be re-threshed as well.

FIG. 7 also shows that window element 122 can be situated anywhere along the travel path of the harvested crop where a sample is to be taken. In one example, the window element 122 can be disposed on a wall proximate the auger that moves grain to the lower end of the clean grain elevator 430. Illumination sources 116 and 118 and sensor 114 can be positioned appropriately to illuminate a grain sample as it moves along the sample window element 122. In another example, a grain sample can be momentarily captured in a measurement chamber to take a measurement with sensor 114 and then re-introduced into the grain pathway for continued processing.

In yet another example, illustrated in FIG. 7, window element 122 can be disposed at the upper end of the clean grain elevator 430, along with illumination sources 116, 118 and sensor 114. It will be noted that these items can be located elsewhere along the grain travel path in harvester 400 as well. Also, crop sampling system 134 can be located closely proximate sensor 114 or elsewhere on harvester 400.

FIG. 7 also shows that, in one example, combine 400 can include ground speed sensor 447, one or more separator loss sensors 448, a clean grain camera 450, a forward looking image capture mechanism 451 (e.g., a stereo or mono camera), and one or more cleaning shoe loss sensors 452. Ground speed sensor 446 illustratively senses the travel speed of combine 400 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 452 illustratively provide an output signal indicative of the quantity of grain loss by both the right and left sides of the cleaning shoe 418. In one example, sensors 452 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 452 can comprise only a single sensor as well, instead of separate sensors for each shoe.

Separator loss sensor 448 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 448 may also comprise only a single sensor, instead of separate left and right sensors.

It will also be appreciated that sensor and measurement mechanisms (in addition to the sensors already described) can include other sensors on combine 400 as well. For instance, they can include a header height sensor that senses a height of header 402 above ground 411. They can include a residue setting sensor that is configured to sense whether machine 400 is configured to chop the residue, drop a windrow, etc. They can include cleaning shoe fan speed sensors that can be configured proximate fan 420 to sense the speed of the fan. They can include a threshing clearance sensor that senses clearance between the rotor 412 and concaves 414. They can include a threshing rotor speed sensor that senses a rotor speed of rotor 412. They can include a chaffer clearance sensor that senses the size of openings in chaffer 422. They can include a sieve clearance sensor that senses the size of openings in sieve 424. They can include a material other than grain (MOG) moisture sensor that can be configured to sense the moisture level of the material other than grain that is passing through combine 400. They can include machine setting sensors that are configured to sense the various configurable settings on combine 400. They can also include a machine orientation sensor that can be any of a wide variety of different types of sensors that sense the orientation of combine 400. Crop property sensors can sense a variety of different types of crop properties, such as crop type, crop moisture, and other crop properties. They can also be configured to sense characteristics of the crop as they are being processed by combine 400. For instance, they can sense grain feed rate, as it travels through the feeder house 406, clean grain elevator 430 or elsewhere in the harvester 400. They can sense mass flow rate of grain through elevator 430 or through other portions of the harvester 400, or provide other output signals indicative of other sensed variables. These are examples only.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 8:
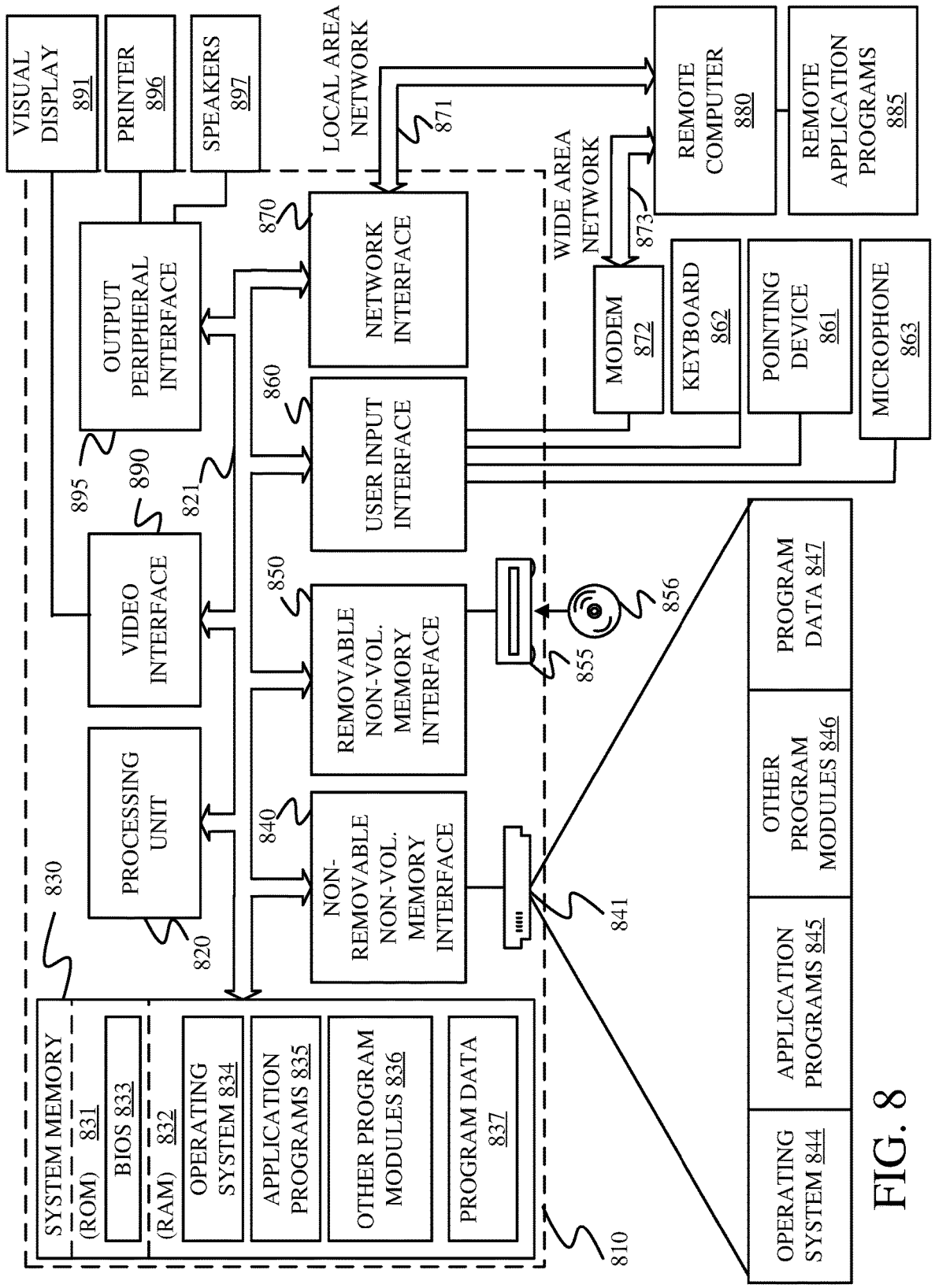
FIG. 8 is a block diagram showing one example of a computing environment that can be deployed on the harvesters to implement the crop sampling system discussed in previous figures.

FIG. 8 is one example of a computing environment in which elements of FIG. 1, or parts of it, (for example) can be deployed. With reference to FIG. 8, an example system for implementing some embodiments includes a computing device in the form of a computer 810 programmed to operate as described above. Components of computer 810 may include, but are not limited to, a processing unit 820 (which can comprise a processor or server from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural mobile machine, comprising:
an illumination source that is actuated to illuminate a crop sample being processed by the agricultural mobile machine, through a sample window element, with electromagnetic radiation;
a detector that detects radiation reflected from the crop sample and generates a detector signal indicative of the reflected radiation;
a temperature sensor that senses a temperature of the sample window element and generates a temperature sensor signal indicative of the sensed temperature; and
a closed loop control system that generates an illumination source control signal to control the illumination source based on the temperature sensor signal.

Example 2 is the agricultural mobile machine of any or all previous examples wherein the detector comprises:
a near infrared radiation spectroscopy sensor.

Example 3 is the agricultural mobile machine of any or all previous examples wherein the closed loop control system comprises:
an illumination source controller configured to generate a lamp on/off signal to turn the illumination source on and off based on the temperature sensor signal.

Example 4 is the agricultural mobile machine of any or all previous examples wherein the closed loop control system comprises:
a sample trigger generator that receives a sample rate signal and generates, based on the sample rate signal, a trigger signal triggering the detector to generate the detector signal.

Example 5 is the agricultural mobile machine of any or all previous examples wherein the illumination source controller is configured to control the illumination source to keep the temperature of the sample window element in a predetermined temperature range.

Example 6 is the agricultural mobile machine of any or all previous examples wherein the illumination source controller is configured to turn the illumination source on and off to maintain the temperature of the sample window between a first threshold temperature value and a second temperature threshold value.

Example 7 is the agricultural mobile machine of any or all previous examples wherein the illumination controller comprises:
a signal conditioning component configured to filter the temperature sensor signal.

Example 8 is the agricultural mobile machine of any or all previous examples wherein the agricultural mobile machine comprises a combine harvester that harvests crop and moves the harvested crop through a crop passageway, the sample window being provided in the crop passageway.

Example 9 is the agricultural mobile machine of any or all previous examples wherein the agricultural mobile machine comprises a self-propelled forage harvester that harvests crop and moves the harvested crop through a crop passageway, the sample window being provided in the crop passageway.

Example 10 is the agricultural mobile machine of any or all previous examples and further comprising:

a geographic position sensor that senses a geographic position of the agricultural mobile machine and generates a position signal indicative of the agricultural mobile machine.

Example 11 is a method of controlling an agricultural mobile machine, comprising:

processing a harvested crop;

actuating an illumination source to illuminate a crop sample being processed by the agricultural mobile machine, through a sample window element, with electromagnetic radiation;

detecting radiation reflected from the crop sample;

generating a detector signal indicative of the reflected radiation;

sensing a temperature of the sample window element;

generating a temperature sensor signal indicative of the sensed temperature; and generating an illumination source control signal, with a closed loop control system, to control the illumination source based on the temperature sensor signal.

Example 12 is the method of any or all previous examples wherein detecting radiation comprises:

detecting near infrared radiation with a spectroscopy sensor.

Example 13 is the method of any or all previous examples generating an illumination source control signal comprises:

generating a lamp on/off signal to turn the illumination source on and off based on the temperature sensor signal.

Example 14 is the method of any or all previous examples wherein detecting radiation comprises:

receiving a sample rate signal; and generating, based on the sample rate signal, a trigger signal triggering the detector to generate the detector signal.

Example 15 is the method of any or all previous examples wherein generating a lamp on/off signal comprises:

controlling the illumination source to keep the temperature of the sample window element in a predetermined temperature range.

Example 16 is the method of any or all previous examples wherein controlling the illumination source comprises:

turning the illumination source on and off to maintain the temperature of the sample window between a first threshold temperature value and a second temperature threshold value.

Example 17 is an agricultural harvester, comprising:

harvesting functionality that harvests crop and moves the harvested crop along a crop travel path, through a crop passageway;

a sample window element that defines a portion of the crop passageway;

an illumination source that is actuated to illuminate a crop sample being processed by the agricultural harvester, through the sample window element, with electromagnetic radiation;

a detector that detects radiation reflected from the crop sample and generates a detector signal indicative of the reflected radiation;

a temperature sensor that senses a temperature proximate the crop sample and generates a temperature sensor signal indicative of the sensed temperature; and a closed loop control system that generates an illumination source control signal to control the illumination source based on the temperature sensor signal.

Example 18 is the agricultural harvester of any or all previous examples wherein the temperature sensor is configured to sense a temperature of the sample window element.

Example 19 is the agricultural harvester of any or all previous examples wherein the detector comprises:

a near infrared radiation spectroscopy sensor.

Example 20 is the agricultural harvester of any or all previous examples wherein the closed loop control system comprises:

an illumination source controller configured to generate a lamp on/off signal to turn the illumination source on and off based on the temperature sensor signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural mobile machine, comprising:
   an illumination source that is actuated to illuminate a crop sample being processed by the agricultural mobile machine, through a sample window element, with electromagnetic radiation;
   a detector that detects radiation reflected from the crop sample and generates a detector signal indicative of the reflected radiation;
   a temperature sensor that senses a temperature of the sample window element and generates a temperature sensor signal indicative of the sensed temperature; and
   a closed loop control system that generates an illumination source control signal to control the illumination source based on the temperature sensor signal.

2. The agricultural mobile machine of claim 1 wherein the detector comprises:
   a near infrared radiation spectroscopy sensor.

3. The agricultural mobile machine of claim 1 wherein the closed loop control system comprises:
   an illumination source controller configured to generate a lamp on/off signal to turn the illumination source on and off based on the temperature sensor signal.

4. The agricultural mobile machine of claim 3 wherein the closed loop control system comprises:
   a sample trigger generator that receives a sample rate signal and generates, based on the sample rate signal, a trigger signal triggering the detector to generate the detector signal.

5. The agricultural mobile machine of claim 3 wherein the illumination source controller is configured to control the illumination source to keep the temperature of the sample window element in a predetermined temperature range.

6. The agricultural mobile machine of claim 5 wherein the illumination source controller is configured to turn the illumination source on and off to maintain the temperature of the sample window between a first threshold temperature value and a second threshold temperature value.

7. The agricultural mobile machine of claim 6 wherein the illumination controller comprises:
   a signal conditioning component configured to filter the temperature sensor signal.

8. The agricultural mobile machine of claim 1 wherein the agricultural mobile machine comprises a combine harvester that harvests crop and moves the harvested crop through a crop passageway, the sample window being provided in the crop passageway.

9. The agricultural mobile machine of claim 1 wherein the agricultural mobile machine comprises a self-propelled forage harvester that harvests crop and moves the harvested crop through a crop passageway, the sample window being provided in the crop passageway.

10. The agricultural mobile machine of claim 1 and further comprising:
a geographic position sensor that senses a geographic position of the agricultural mobile machine and generates a position signal indicative of the agricultural mobile machine.

11. A method of controlling an agricultural mobile machine, comprising:
processing a harvested crop;
actuating an illumination source to illuminate a crop sample being processed by the agricultural mobile machine, through a sample window element, with electromagnetic radiation;
detecting radiation reflected from the crop sample;
generating a detector signal indicative of the reflected radiation;
sensing a temperature of the sample window element;
generating a temperature sensor signal indicative of the sensed temperature; and
generating an illumination source control signal, with a closed loop control system, to control the illumination source based on the temperature sensor signal.

12. The method of claim 11 wherein detecting radiation comprises:
detecting near infrared radiation with a spectroscopy sensor.

13. The method of claim 11 generating an illumination source control signal comprises:
generating a lamp on/off signal to turn the illumination source on and off based on the temperature sensor signal.

14. The method of claim 13 wherein detecting radiation comprises:
receiving a sample rate signal; and
generating, based on the sample rate signal, a trigger signal triggering the detector to generate the detector signal.

15. The method of claim 13 wherein generating a lamp on/off signal comprises:
controlling the illumination source to keep the temperature of the sample window element in a predetermined temperature range.

16. The method of claim 15 wherein controlling the illumination source comprises:
turning the illumination source on and off to maintain the temperature of the sample window between a first threshold temperature value and a second temperature threshold value.

17. An agricultural harvester, comprising:
harvesting functionality that harvests crop and moves the harvested crop along a crop travel path, through a crop passageway;
a sample window element that defines a portion of the crop passageway;
an illumination source that is actuated to illuminate a crop sample being processed by the agricultural harvester, through the sample window element, with electromagnetic radiation;
a detector that detects radiation reflected from the crop sample and generates a detector signal indicative of the reflected radiation;
a temperature sensor that senses a temperature proximate the crop sample and generates a temperature sensor signal indicative of the sensed temperature; and
a closed loop control system that generates an illumination source control signal to control the illumination source based on the temperature sensor signal.

18. The agricultural harvester of claim 17 wherein the temperature sensor is configured to sense a temperature of the sample window element.

19. The agricultural harvester of claim 17 wherein the detector comprises:
a near infrared radiation spectroscopy sensor.

20. The agricultural harvester of claim 17 wherein the closed loop control system comprises:
an illumination source controller configured to generate a lamp on/off signal to turn the illumination source on and off based on the temperature sensor signal.

* * * * *